(12) United States Patent
Lu et al.

(10) Patent No.: US 10,363,706 B2
(45) Date of Patent: Jul. 30, 2019

(54) THREE DIMENSIONAL PRINTING METHOD AND APPARATUS USING THE SAME

(71) Applicants: XYZprinting, Inc., New Taipei (TW);
Kinpo Electronics, Inc., New Taipei (TW)

(72) Inventors: Ting-Yu Lu, New Taipei (TW);
Yi-Lung Lin, New Taipei (TW)

(73) Assignees: XYZprinting, Inc., New Taipei (TW);
Kinpo Electronics, Inc., New Taipei (TW)

( * ) Notice: Subject to any disclaimer, the term of this patent is extended or adjusted under 35 U.S.C. 154(b) by 403 days.

(21) Appl. No.: 15/064,608

(22) Filed: Mar. 9, 2016

(65) Prior Publication Data

US 2017/0151716 A1    Jun. 1, 2017

(30) Foreign Application Priority Data

Dec. 1, 2015    (CN) .......................... 2015 1 0864385

(51) Int. Cl.

| | |
|---|---|
| *B29C 64/40* | (2017.01) |
| *B29C 48/15* | (2019.01) |
| *B33Y 10/00* | (2015.01) |
| *B33Y 30/00* | (2015.01) |
| *B29C 64/112* | (2017.01) |
| *B29C 70/68* | (2006.01) |
| *B33Y 50/02* | (2015.01) |
| *B29C 64/393* | (2017.01) |

(Continued)

(52) U.S. Cl.
CPC .............. *B29C 64/40* (2017.08); *B29C 48/15* (2019.02); *B29C 64/112* (2017.08); *B29C 64/393* (2017.08); *B29C 70/68* (2013.01); *B33Y 10/00* (2014.12); *B33Y 30/00* (2014.12); *B33Y 50/02* (2014.12); *B29L 2009/00* (2013.01); *B33Y 50/00* (2014.12)

(58) Field of Classification Search
CPC ....................................................... B29C 64/40
See application file for complete search history.

(56) References Cited

U.S. PATENT DOCUMENTS

| | | | |
|---|---|---|---|
| 7,917,243 B2 | 3/2011 | Kozlak et al. | |
| 8,858,856 B2 * | 10/2014 | Kozlak | ................. B29C 64/135 264/259 |

* cited by examiner

*Primary Examiner* — Timothy Kennedy
(74) *Attorney, Agent, or Firm* — JCIPRNET (57) ABSTRACT

A 3D printing method and apparatus using the same are provided. The printing method includes: generating a two-dimensional layer information related with multiple layer objects of a three-dimensional object according to a three-dimensional model information, whereas the three-dimensional object has a forming part and an object embedded part; analyzing the two-dimensional layer information to identify a forming region and an object embedded region within each of the layer objects, whereas the forming regions constitute the forming part and the object embedded regions constitute the object embedded part; selecting at least one section of the three-dimensional object as a separation plane; printing the layer objects, layer by layer, with a forming material and a supporting material, to coat the forming material onto the forming region without overlapping with the separation plane, and coat the supporting material onto the forming region overlapping with the separation plane and the object embedded region.

20 Claims, 8 Drawing Sheets

(51) Int. Cl.
*B33Y 50/00* (2015.01)
*B29L 9/00* (2006.01)

THREE DIMENSIONAL PRINTING METHOD AND APPARATUS USING THE SAME

CROSS-REFERENCE TO RELATED APPLICATION

This application claims the priority benefit of China patent application serial no. 201510864385.0, filed on Dec. 1, 2015. The entirety of the above-mentioned patent application is hereby incorporated by reference herein and made a part of the specification.

BACKGROUND OF THE INVENTION

1. Field of the Invention

The present invention generally relates to printing technology and the application thereof, in particular, to three dimensional printing method and apparatus using the printing method.

2. Description of Related Art

As the progressing on computer-aided manufacturing (CAM), manufacturer has developed the three-dimensional (3D) printing technology, which can rapidly manufacture the object with the original design concept. The 3D printing technology actually is a general term for a series of rapid prototyping (RP) technology, in which the principles are the same based on manufacture by stacking layers. The RP machine forms, by scanning, a cross-sectional shape of a layer of the working piece on the XY plane and shifts on the Z axis by a step to have the layer thickness. The 3D working piece would be formed at the end. The 3D printing technology is not limited by the geometric shape and the advantage of the RP technology can be more extraordinarily seen as the structure of the working piece is more complicate. This can greatly reduce the manpower and the working time. Under the request with minimum time, the digital 3D model as designed by the 3D CAD software can be practically presented with touchable and the realistic feeling about the geometric curving shape. Further, the element assembly can be tested, and the function as possible can even be tested.

Generally, the 3D printing apparatus in current stage using the above RP method to form the 3D object is usually reading a digital 3D model to build the 3D object in correlation with the digital 3D model. However, for the complex object including embedded object incapable of being printed such as the mother board, electronic circuit or structure member having the metal part, it cannot be directly printed in an integrated single form by the 3D printing apparatus.

In the current application to fabricate such complex object, usually, only can the printable part of the complex object be printed by the 3D printing apparatus. The printing process performs until it reaches to a specific embedded location judged by the user, the printing process of the 3D printing apparatus is controlled to be pause and the embedded object being incapable of printing is manually disposed into the 3D object which has been partly printed, and the 3D printing apparatus is controlled again to continuously perform the printing process. This is not a friendly operation to the user as consideration on operation/convenient-application. In addition, if a shift occurs on the platform or the printing head of the 3D printing apparatus, caused by disposing the embedded object, then it may cause imprecision position for the subsequent action of the printing process. The operation precision of the 3D printing apparatus then decreases.

SUMMARY OF THE INVENTION

Accordingly, the present invention is directed to a three dimensional printing method and apparatus using the printing method, capable of solving the issues as stated in prior art.

The three dimensional printing method in the invention includes the steps: generating a two-dimensional layer information related with multiple layer objects of a three-dimensional object according to a three-dimensional model information, wherein the three-dimensional object has a forming part and an object embedded part; analyzing the two-dimensional layer information to identify a forming region and an object embedded region within each of the layer objects, wherein the forming regions constitutes the forming part and the object embedded regions constitutes the object embedded part; selecting at least one section of the three-dimensional object as a separation plane; and printing the layer objects, layer by layer, with a forming material and a supporting material, to coat the forming material onto the forming region without overlapping with the separation plane, and coat the supporting material onto the forming region overlapping with the separation plane and the object embedded region.

In an embodiment of the invention, the step of selecting the at least one section of the three-dimensional object as the separation plane includes: calculating a sectional area of the object embedded part according to the two-dimensional layer information; and selecting a section with the sectional area of the object embedded part satisfying with a setting condition as the separation plane.

In an embodiment of the invention, the step of selecting the section with the sectional area of the object embedded part satisfying with the setting condition as the separation plane comprises selecting a section with a maximum of the sectional area of the object embedded part as the separation plane.

In an embodiment of the invention, the step of selecting the section with the sectional area of the object embedded part satisfying with the setting condition as the separation plane further comprises selecting a middle one of a plurality of sections with a maximum sectional area of the object embedded part as the separation plane when the sections with the maximum sectional area are continuous.

In an embodiment of the invention, the step of selecting the at least one section of the three-dimensional object as the separation plane comprises selecting at least one of the layer objects as a first separation layer, and forming a formed layer for each of the rest of the layer objects.

In an embodiment of the invention, the step of printing the layer objects, layer by layer, with the forming material and the supporting material, to coat the forming material onto the forming region without overlapping with the separation plane, and coat the supporting material onto the forming region overlapping with the separation plane and the object embedded region comprises coating the forming material onto the forming region and coating the supporting material onto the object embedded region when a printed one of the layer objects is the formed layer, and coating the supporting material onto the forming region and the object embedded region when a printed one of the layer objects is the first separation layer.

In an embodiment of the invention, further comprises selecting a part region for each of the layer objects as a separation region, wherein the separation regions form a second separation layer.

In an embodiment of the invention, the step of printing the layer objects, layer by layer, with the forming material and the supporting material, to coat the forming material onto the forming region without overlapping with the separation plane, and coat the supporting material onto the forming region overlapping with the separation plane and the object embedded region comprises: coating the fruiting material onto the forming region other than the separation region; and coating the supporting material onto the separation region and the object embedded region.

In an embodiment of the invention, a normal line direction of the first separation layer and a normal line direction of the second separation layer are not parallel.

In an embodiment of the invention, further comprises selecting a part region for each of the layer objects as a separation region, wherein the separation regions form a separation layer.

The three dimensional printing apparatus in the invention includes a platform, a printing head module and a control unit. The platform has a supporting plane. The printing head module is disposed over the platform. The printing head module is implemented to move along a moving plane and move along a normal line direction of the moving plane. The control unit is coupled to the printing head module to control the printing head module to coat a forming material and a supporting material, layer by layer, onto the supporting plane, according to a three-dimensional model information, so as to form a three-dimensional object, wherein the three-dimensional object has a forming part and an object embedded part. The control unit generates a two-dimensional layer information related with a plurality of layer objects of the three-dimensional object according to the three-dimensional model information and analyzes the two-dimensional layer information to identify a forming region and an object embedded region within each of the layer objects, wherein the forming regions constitute the forming part and the object embedded regions constitute the object embedded part. The control unit selects at least one section of the three-dimensional object as a separation plane and controls the printing head module to coat the forming material onto the forming region without overlapping with the separation plane, and coat the supporting material onto the forming region overlapping with the separation plane and the object embedded region.

In an embodiment of the invention, the control unit calculates a sectional area of the object embedded part according to the two-dimensional layer information and selects a section with the sectional area of the object embedded part satisfying with a setting condition as the separation plane.

In an embodiment of the invention, the control unit selects a section with a maximum of the sectional area of the object embedded part as the separation plane.

In an embodiment of the invention, the control unit selects a middle one of a plurality of sections with a maximum sectional area of the object embedded part as the separation plane when the sections with the maximum sectional area are continuous.

In an embodiment of the invention, the control unit selects at least one of the layer objects as a first separation layer, and forms a formed layer for each of the rest of the layer objects.

In an embodiment of the invention, the control unit controls the printing head module to coat the forming material onto the forming region and coating the supporting material onto the object embedded region when a printed one of the layer objects is the formed layer and the control unit controls the printing head module to coat the supporting material onto the forming region and the object embedded region when a printed one of the layer objects is the first separation layer.

In an embodiment of the invention, the control unit further selects a part region for each of the layer objects as a separation region, wherein the separation regions form a second separation layer.

In an embodiment of the invention, the control unit controls the printing head module to coat the forming material onto the forming region other than the separation region and to coat the supporting material onto the separation region and the object embedded region.

In an embodiment of the invention, the control unit further selects a part region for each of the layer objects as a separation region, wherein the separation regions form a separation layer.

As to the foregoing descriptions, the disclosure provides a three dimensional printing method and apparatus using the printing method. In applications of the disclosure, the three dimensional printing apparatus can selects a specific section of the three-dimensional object as a separation plane and coat the supporting material on the separation as selected. Thus, the three-dimensional object as completely printed can divided into two or more parts according to the separation plane serving as a cutting/dividing plane. More specifically, by the foregoing three dimensional printing method, the user can remove the supporting material after the three-dimensional object has been completely printed and the three-dimensional object thereby can be divided into multiple parts. The embedded object incapable of being printed can be disposed into a portion of the object embedded part and each part of the three-dimensional object is assembled together as a full complex object. In comparison with the conventional three-dimensional printing method for complex object, the three-dimensional printing method of disclosure can directly print the full three-dimensional object without need of stopping print process at the middle stage and then keeping on print process after manually disposing the object into the object embedded part. As a whole in application, the convenient effect can be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the exemplary embodiments of the disclosure, examples of which are illustrated in the accompanying drawings.

For easily understanding the content of the disclosure, several exemplary embodiments are provided for description, In the provided embodiments, the terms of "up", "down", "front", "back", "left", "right", and so on are just for reference based on the direction of the drawings. The tellers about the direction are used for descriptions but not for limiting the invention. In addition, wherever possible, the same reference numbers are used in the drawings and the description to refer to the same or like parts.

Figure 1A:
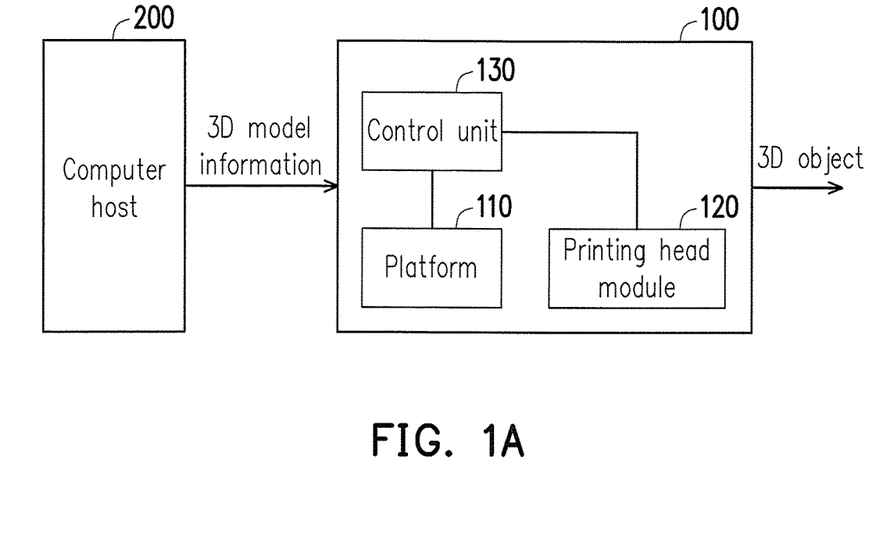
FIG. 1A is a drawing, schematically illustrating the functional blocks of the three-dimensional printing apparatus, according to an exemplary embodiment of the disclosure.

FIG. 1A is a drawing, schematically illustrating the functional blocks of the three-dimensional printing apparatus, according to an exemplary embodiment of the disclosure. Referring to FIG. 1A, the three-dimensional (3D) printing apparatus 100 of the embodiment is suitable for printing a 3D object according to a 3D model information. In further words, a computer host 200 is an apparatus with the computing function, such as the notebook computer, tablet computer or desktop computer et al., as the computing apparatus. The invention is not just limited to a specific type for the computer host 200. The computer host 200 can edit and process a 3D model of a 3D object and transmit the 3D model information to a 3D printing apparatus 100, so the 3D printing apparatus 100 can print the 3D object according to the 3D model information. In the embodiment, the 3D model information can be a 3D digital image file, which can be for example built up by computer host 200 through the CAD or the animation modelling software. The digital 3D model information is divided into multiple sections related with the 3D object as a two-dimensional layer information. The 3D printing apparatus 100 can sequentially obtain the layer objects according to the two-dimensional layer information of the digital 3D model information, in which the layer objects are staked up to form the 3D object.

In detail, the 3D printing apparatus 100 includes a platform 110, a printing head module 120 and a control unit 130. Here, the descriptions are also associating with FIG. 1B, which is a drawing about an implementation of the 3D printing apparatus 100 in an exemplary embodiment. The Cartesian coordinate system is also provided for easy descriptions about the movement status for the relating elements.

Figure 1B:
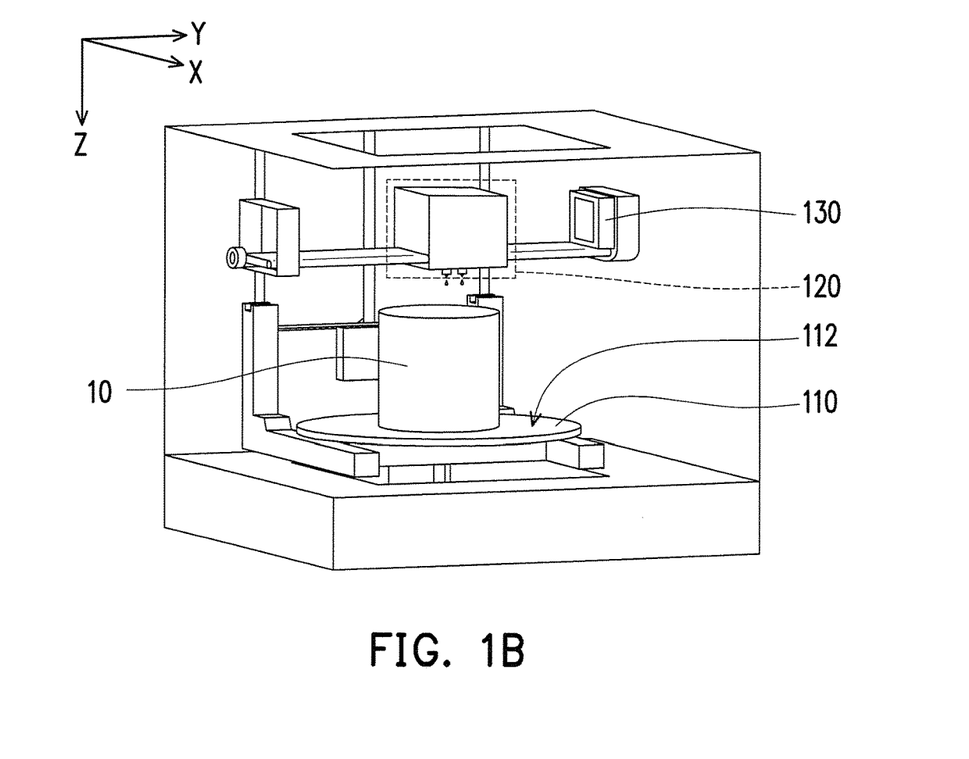
FIG. 1B is a drawing, schematically illustrating an implementation of the three-dimensional printing apparatus in FIG. 1A, according to an exemplary embodiment of the disclosure.

Referring to FIG. 1A and FIG. 1B, the platform 110 has a supporting plane 112. The printing head module 120 is disposed over the platform 110. The printing head module 120 is implemented to move along the XY plane and move along a normal line direction (Z direction) of the XY plane. The control unit 130 is coupled to the printing head module 120, which can control a moving path of the printing head module 120 according to the 3D model information to coat a stacking-layer material, layer by layer, onto the supporting plane 112, so as to form a 3D object 10.

Specifically the implementation for the 3D print in the embodiment can be a material jetting 3D printing technology as an example. Taking an example, when the 3D printing apparatus 100 is a material jetting 3D printing apparatus, the printing head module 120 can be a jetting heat in an example to jet out a forming material. The forming material as deposited can be the photosensitive resin in liquid or jam state. The printing head module 120 can jet the foaming material onto the supporting plane 112 of the platform 110. The resin can be cured as the forming material by natural cure or by a specific light, so to form the sectional layer as intended. Therefore, the resin with the photosensitive resin in liquid or jam state can be cured over the supporting plane layer by layer to form the 3D object. Remarkably, the 3D printing apparatus 100 as stated above is taking the material jetting 3D printing apparatus as the example but is not limited to this example. The scope of the invention covers the any 3D printing apparatus, which uses the printing head module 120 to coat the forming material over the platform 110, layer by layer.

In an embodiment, when the 3D object 10 to be formed is to combine with an object incapable of being formed by the 3D printing manner, such as metal material, the 3D object 10 has a forming part, which is to form the main body and the profile, and additionally has an object embedded part in correspondence to provide the space for combining with other object. When the 3D object 10 as designed has the object embedded part, for printing by any 3D printing technology, the object embedded part needs to provide sufficient supporting structure, and thereby to avoid that the object embedded part is distorted after the 3D object 10 is formed due to stress concentration caused by having no supporting structure.

Thus, in the embodiment, the stacking-layer material of the 3D object 10 includes forming material and supporting material as an example. The foiming material is used to build up the main body and profile of the 3D object 10. As an example, the forming material can be photopolymer in liquid state and the supporting material is used to support the 3D object 10. After the stack-layer material having been formed over the supporting plane 112 is cured, the supporting material is then removed to obtain the 3D object 10.

For the implementation in hardware, the printing head module 120 in an example can include a printing head, material providing line, belt, sliding wheel, and so on as the hardware elements, integrated together as a whole. The control unit 130 in an example can be the equipment having the computing function such as central processing unit, chip set, processor, embedded controller, and so on. The hardware elements stated above are not the only limitation.

Figure 2:
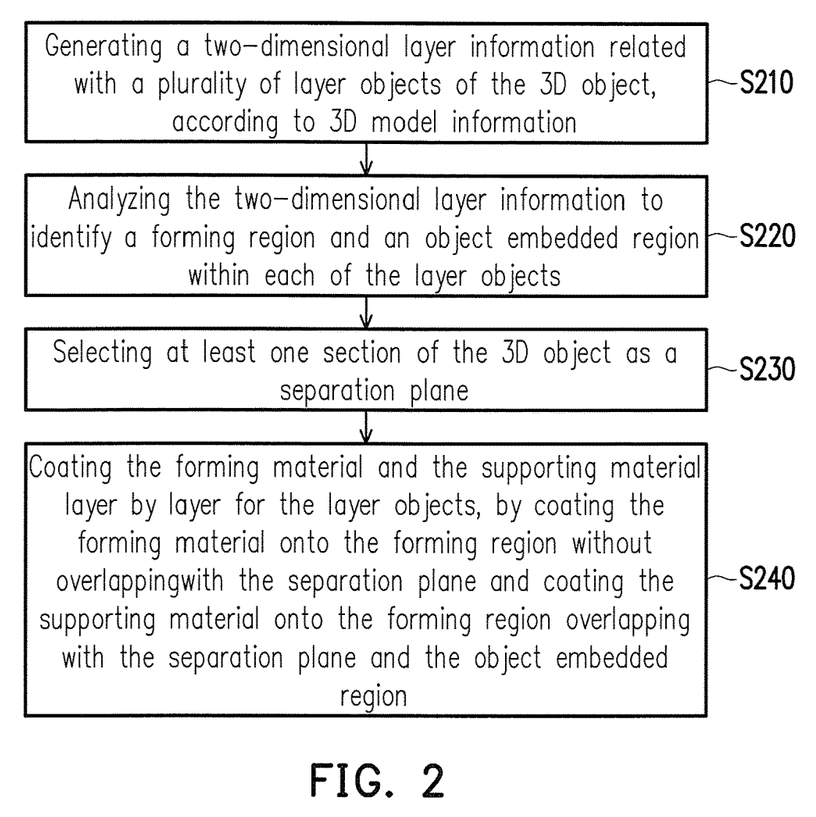
FIG. 2 is a drawing, schematically illustrating a process flow for a three-dimensional printing method, according to an exemplary embodiment of the disclosure.

A three-dimensional printing method according to an exemplary embodiment of the disclosure is further described as follows based on FIG. 2. FIG. 2 is a drawing, schematically illustrating a process flow for a three-dimensional printing method, according to an exemplary embodiment of the disclosure.

Referring to FIG. 1A, FIG. 1B and FIG. 2, firstly, the control unit 130 of the 3D printing apparatus 100 would receive the 3D model information from the computer host 200 and generates a two-dimensional layer information related with a plurality of layer objects of the 3D object 10 according to the 3D model information, wherein the 3D object 10 can be treated as a stack from the layer objects (step S210). After the two-dimensional layer information has been obtained, the control unit 130 further analyzes the two-dimensional layer information to identify a forming region and an object embedded region within each of the layer objects (Step S220). Then, the control unit 130 selects at least one section of the 3D object 10 as a separation plane according to the two-dimensional layer information (Step S230) and controls the printing head module 120 to coat the forming material and the supporting material layer by layer for the layer objects, by coating the forming material onto the forming region without overlapping with the separation plane and coating the supporting material onto the forming region overlapping with the separation plane and the object embedded region (Step S240).

Figure 3A:
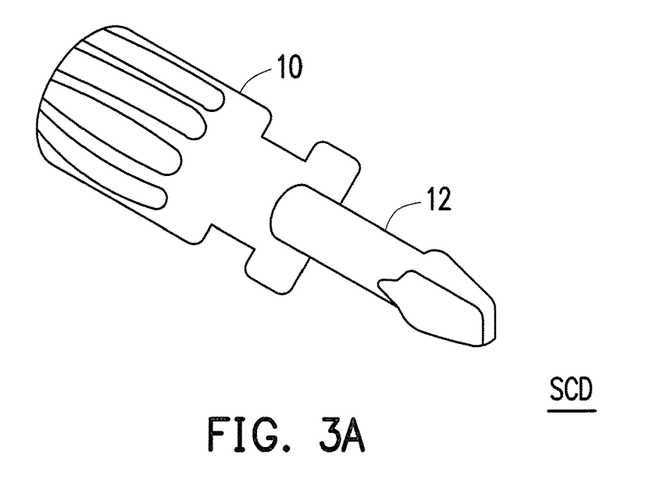
FIG. 3A-FIG. 3C are drawings, schematically illustrating a three-dimensional object, according to an exemplary embodiment of the disclosure.
Figure 3B:
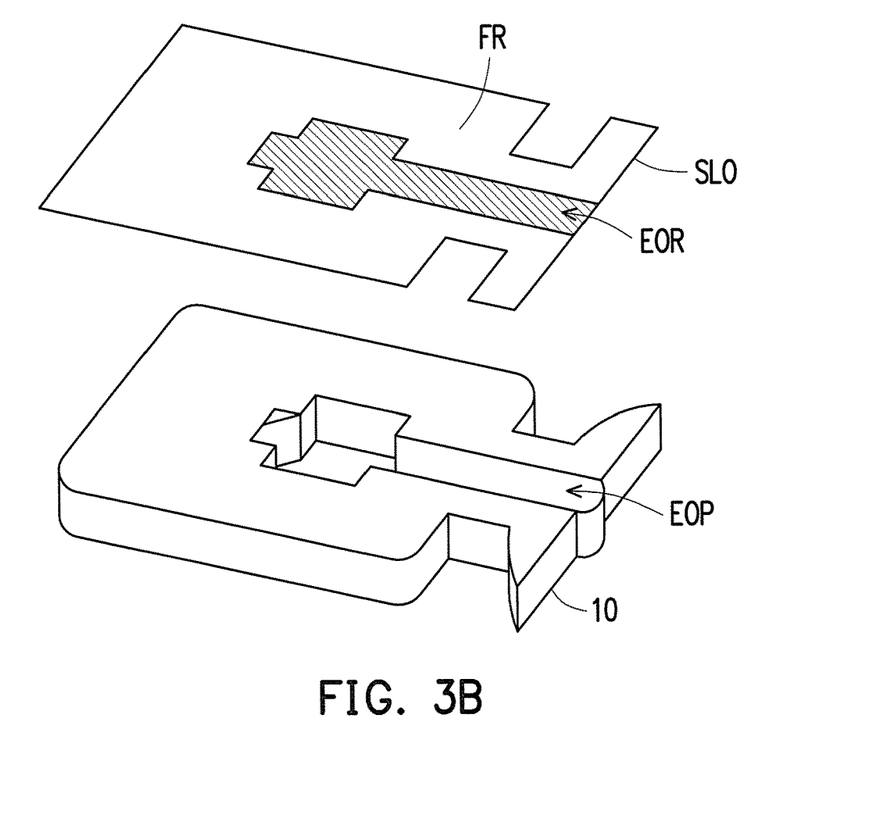
Figure 3C:
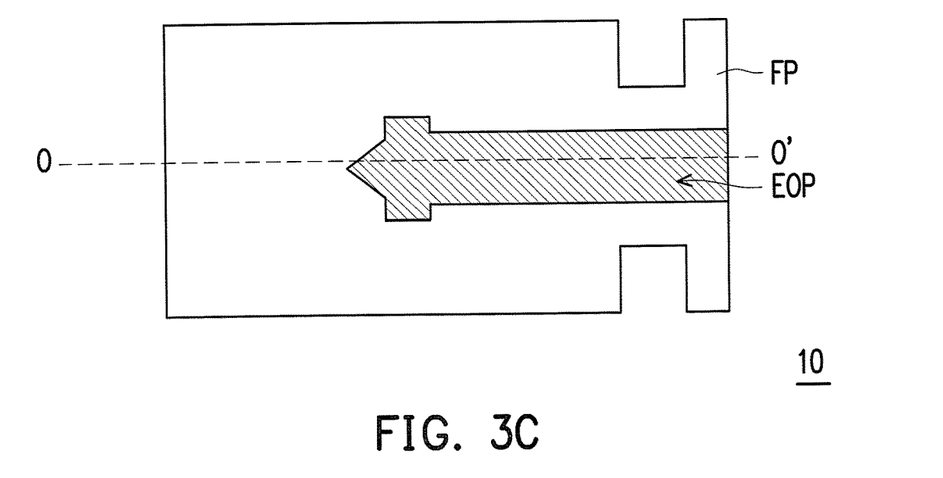

The 3D object as shown in FIG. 3A to FIG. 3C is taken as the example in the following descriptions to describe the 3D printing method of the disclosure. FIG. 3A is a drawing, schematically illustrating a perspective view of a three-dimensional object, according to an exemplary embodiment of the disclosure. FIG. 3B is a drawing, schematically illustrating a cross-sectional top view of the three-dimensional object in FIG. 3A, according to an exemplary embodiment of the disclosure. FIG. 3C is a drawing, schematically illustrating a side view of the three-dimensional object in FIG. 3A, according to an exemplary embodiment of the disclosure.

Firstly, referring to FIG. 3A, the complex object SCD in the embodiment is taking a screw driver as an example, which includes a handle part 10 and the metal part 12. The metal part 12 is an object incapable of printing and is inserted into the handle part 10, which is built by the 3D printing manner in the embodiment. In other words, the handle part 10 is the 3D object formed by the 3D printing apparatus 100 and would be called the 3D object 10 in the following descriptions.

A cross-sectional top view and a side view of the 3D object 10 are respectively shown in FIG. 3B and FIG. 3C. In 3D object 10 of the embodiment, it includes a forming part FP and object embedded part EOP, in which the forming part FP constitutes the main body and profile of the 3D object 10 and the object embedded part EOP is to provide the space for disposing the metal part 12. In addition, the upper drawing of FIG. 3B of the embodiment illustrates the layer object SLO, which represents the layer object at the cutting line OO' on the 3D object 10. The sectional drawing in following descriptions would take the specific cutting line on the 3D object 10. According to the constitutions at each section of the 3D object 10, each layer object SLO has a forming region FR and/or the object embedded region EOR, in which the forming region in each layer objects SLO is stacked up together to form the forming part FP of the 3D object 10. Likewise, the object embedded region EOR in each layer objects SLO is stacked up together to form the object embedded part EOP of the 3D object 10.

By the 3D printing method as described in the embodiments of the invention above, during the printing process, the section of the 3D object 10 having been selected as the separation plane would be coated with supporting material, so that the 3D object 10 having been completely printed can be divided into two or more parts based on the separation plane serving as the cutting/dividing plane. Wherein, the selected separation plane is usually overlapping with a portion of the object embedded part, the user can thereby dispose the embedded object which is incapable of printing into a portion of the object embedded part after the 3D object 10 has been completely printed. Then, each part of the 3D object 10 is assembled together to form the full complex object SCD. In comparison with the conventional 3D printing method for complex object, the 3D printing method of the disclosure can directly print the full 3D object without need of stopping print process at the middle stage and then keeping on print process after manually disposing the object into the object embedded part. As a whole in application, the convenient effect can be improved. In addition, it can reduce the probability that the 3D printing apparatus in the printing process may be affected by the user's manual operation and then it can reduce the risk in losing the operation precision.

In addition, under the 3D printing method of the disclosure, if a shift occurs on the platform or the printing head of the 3D printing apparatus caused by disposing the embedded object the 3D printing method of the disclosure, then it may result in miss positioning for the subsequent printing action and reducing operation precision of the 3D printing apparatus.

In the embodiment, the selection of the separation plane can be defined as the actual need in design. For example, the separation plane at a specific location of the 3D printing object 10 can be a transverse section, that is, the section has a normal line direction the same as the normal line direction of the XY plane, a longitudinal section, that is, a plane perpendicular to the XY plane, or a section with a specific normal line direction. However, the invention is not limited to these.

Figure 4A:
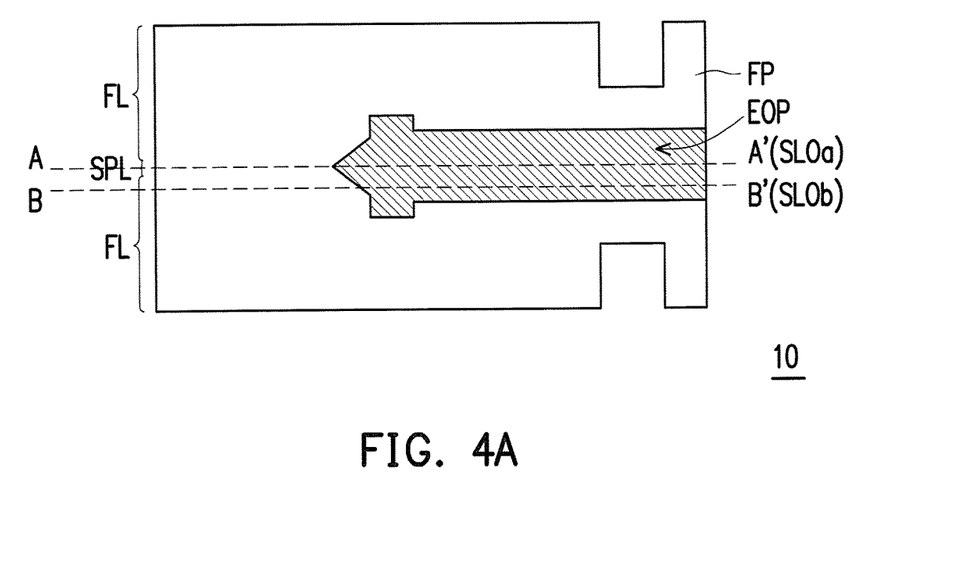
FIG. 4A-FIG. 4C are drawings, schematically illustrating a process flow for printing a three-dimensional object, according to an exemplary embodiment of the disclosure.
Figure 4B:
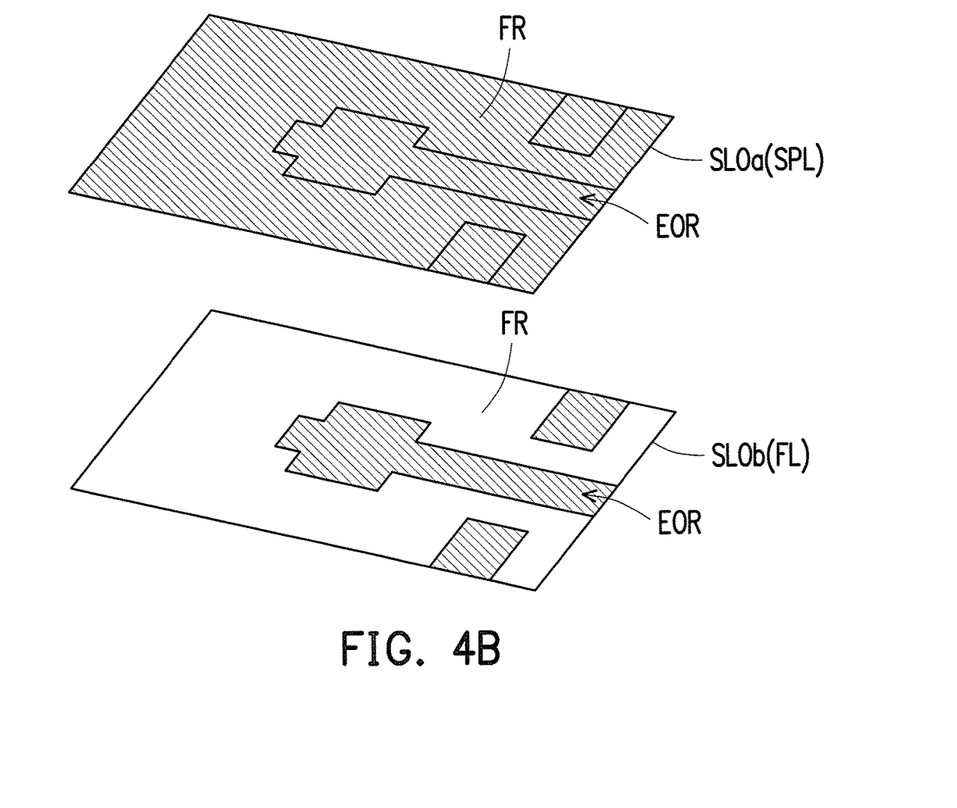
Figure 4C:
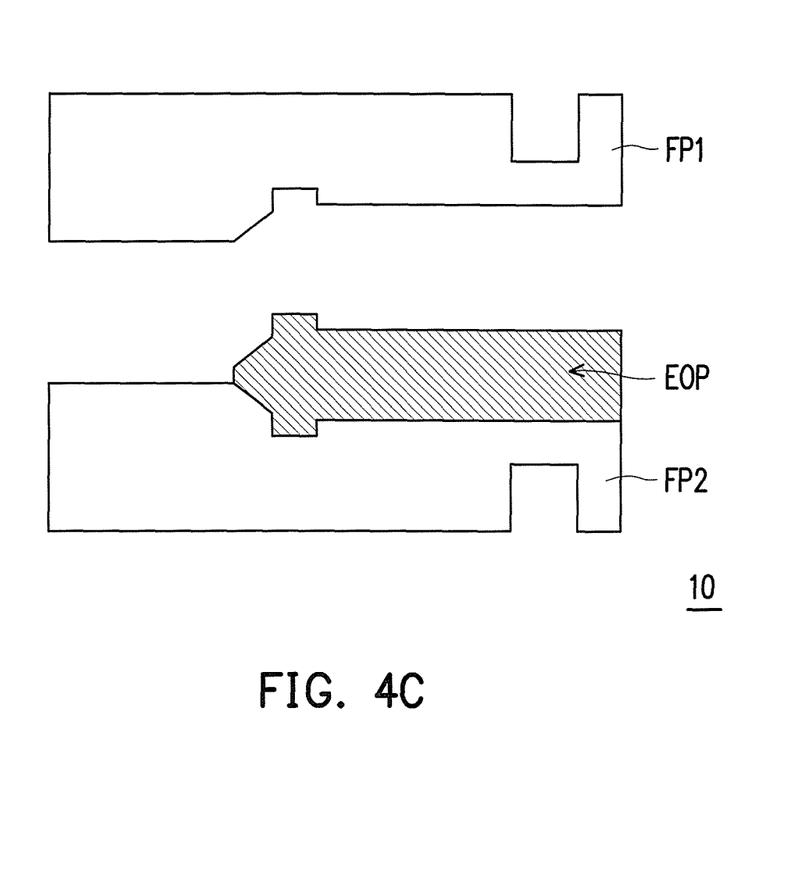

When the separation plane is defined to be the transverse section at a specific location of the 3D printing object 10, the control unit 130 can select, based on a specific selection rule, the layer object SLO of the 3D object 10 overlapping with the separation plane as the separation layer, to which embodiments in FIG. 4A to FIG. 4C would be further described. On the other hand, when the separation plane is defined to be the longitudinal section at a specific location of the 3D printing object 10, the control unit 130 can select, based on a specific selection rule, a portion region in each of the layer objects having been overlapping with the separation plane as the separation region. The separation region in each layer object would stack up as a separation layer, to which embodiments in FIG. 5A to FIG. 5C would be further described.

In addition, the selection rule in an example can be that the control unit 130 calculates a sectional area of the object embedded part of the 3D object 10 according to the two-dimensional layer information. After the normal line direction of the separation plane is determined, by comparing each sectional area of each section of the object embedded part with the normal line direction, a section with the sectional area of the object embedded part satisfying with a setting condition is selected as the separation plane. The setting condition can be, for example, a maximum sectional the area or the one with sectional area greater than a specific threshold.

Preferably, the selection to the section with the maximum section area as the separation plane can allow the embedded object to be easily disposed into the object embedded part of the 3D object 10. The following embodiment takes the example to select the section with the maximum section area as the separation plane for exemplary descriptions but the invention is not limited to these.

FIG. 4A to FIG. 4C are drawings, schematically illustrating a process flow for printing a three-dimensional object, according to an exemplary embodiment of the disclosure. FIG. 4A is a drawing, schematically illustrating the side view structure of the 3D object built by the 3D printing method, according to an exemplary embodiment of the disclosure. FIG. 4B is a drawing, schematically illustrating a cross-sectional top view of the layer objects SLOa and SLOb at the cutting lines AA' and BB' in FIG. 4A, according to an exemplary embodiment of the disclosure. FIG. 4C is a drawing, schematically illustrating the 3D object after separation.

Referring first to FIG. 4A, the embodiment selects the transverse section of the 3D object 10 as the separation plane. In the embodiment, after the control unit 130 receives the 3D model information from the computer host 200, the control unit 130 calculates the area of the object embedded region of each layer object according to the two-dimensional layer information. According to the shape of the object embedded part of the 3D object 10 in the embodiment, the control unit 130 calculates and finds the one having the maximum area of object embedded region for the layer object SLOa at the section along the cutting line AA' of the 3D object 10, and the control unit 130 then selects the one of the layer object SLOa as the separation layer SPL. In addition, the other layer object SLOa not selected is defined as the forming layer FL.

After the layer object SLOa is selected as the separation layer SPL, the control unit 130 then controls the printing head module 120 to print the layer objects, layer by layer. When the layer object being printed is the fowling layer FL, taking the layer object SLOb at the section along the cutting line BB' in FIG. 4B as the example, the printing head module 120 the coats the forming material onto the forming region FR and coats the supporting material onto the object embedded region EOR. As shown in drawing, the shading part represents the region coated with the supporting material. The part without shading represents the region coated with forming material. On the other hand, when the layer object being printed is the separation layer SPL, the printing head module 120 coats the supporting material onto the forming region FR and the object embedded region EOR.

As a result, when each of the layer objects of the 3D object 10 is completely printed, the user can remove the supporting material to divide the 3D object 10 into the upper part FP1 and the lower part FP2 by the separation layer SPL, as shown in FIG. 4C. After then, the user can dispose the embedded object into the object embedded region EOP and adhere the upper part FP1 and the lower part FP2 of the 3D object 10, such that the complex object SCD has been completely built up.

Figure 5A:
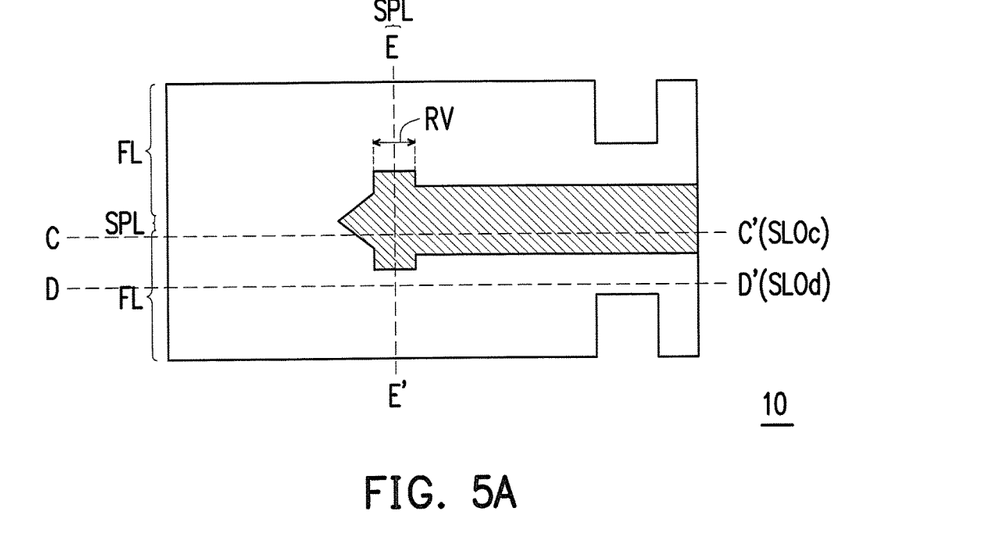
FIG. 5A-FIG. 5C are drawings, schematically illustrating a process flow for printing a three-dimensional object, according to an exemplary embodiment of the disclosure.
Figure 5B:
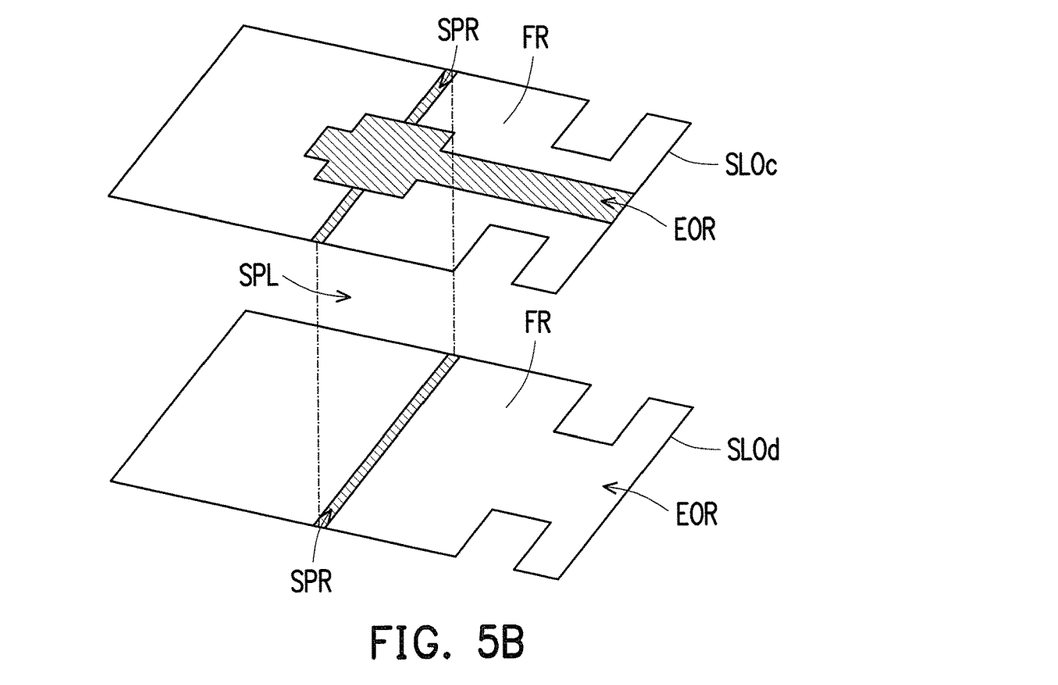
Figure 5C:
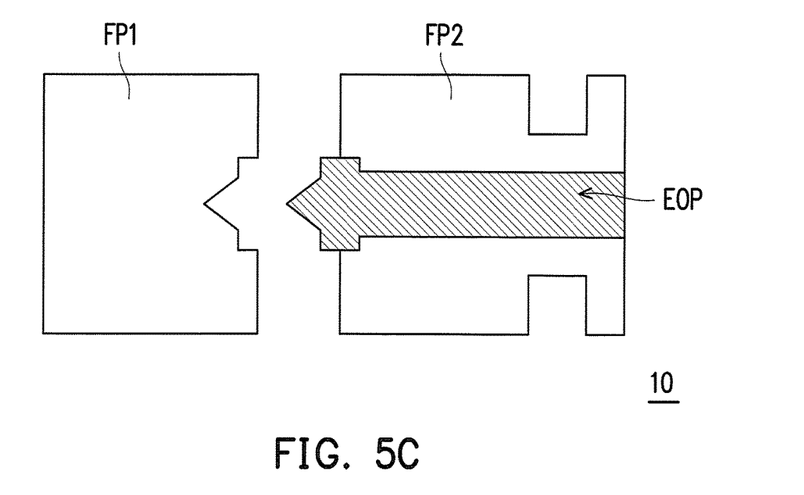

FIG. 5A-FIG. 5C are drawings, schematically illustrating a process flow for printing a three-dimensional object, according to an exemplary embodiment of the disclosure. FIG. 5A is a drawing, schematically illustrating a side view structure of the 3D object built by the 3D printing method, according to an exemplary embodiment of the disclosure. FIG. 5B is a drawing, schematically illustrating a top view structure for the layer objects SLOa and SLOb, respectively cut along the cutting lines CC' and DD' in FIG. 5A. FIG. 5C is a drawing, schematically illustrating the 3D object after separation.

Referring first to FIG. 5A, the embodiment takes the longitudinal section of the 3D object 10 as the separation plane as an example. In the embodiment, after the control unit 130 receives the 3D model information from the computer host 200, the control unit 130 calculates the area of the object embedded region of each layer object according to the two-dimensional layer information. According to the shape of the object embedded part of the 3D object 10 in the embodiment, the control unit 130 calculates and finds that section areas of the object embedded region within the region Rv of the 3D object 10 is equal at the maximum. In the embodiment, the control unit 130 the selects the central section within the region Rv, that is, the section at the cutting line EE' as the separation plane but the invention is not just limited to this. In other embodiments, the user can let the control unit 130 select any section within the region Rv as the separation plane, according to the consideration on actual design.

In the embodiment with better detail, the control unit 130 would select a portion in each layer object overlapping with the separation plane as the separation region, as the separation region SPR shown in FIG. 5B. The separation region in each of the layer objects is attacked up to form the separation layer SPL. As additional not here, the width of the separation region selected by the control unit 130 from each of the layer objects can be defined according to the actual need in design, it can be equal or similar thickness for all of the layer objects but the invention is not just limited to this.

After the separation region SPR in the layer objects has been selected, the control unit 130 then controls the printing head module 120 to print the layer objects, layer by layer. In the embodiment, the printing head module 120 coats the forming material onto the forming region FR at the region other than the separation region SPR and coats the supporting material on the separation region SPR and the object embedded region EOR.

The layer object SLOc and the layer object SLOd respectively at the cutting lines CC' and DD' are taken as the examples for descriptions, as shown in FIG. 5B. When the printing head module 120 prints to the layer object SLOd without including the object embedded region EOR, the printing head module 120 coats the forming material onto the forming region FR within the region other than the separation region SPR and coats the supporting material onto the separation region SPR. As shown in drawing, the shading part represents the region coated with the supporting material. The part without shading represents the region coated with forming material. On the other hand, when printing head module 120 prints to the layer object SLOc including the object embedded region EOR, the printing head module 120 also coats the forming material onto the forming region FR within the region other than the separation region SPR and further coats the supporting material onto the forming region FR and the separation region SPR.

Thus, when each of the layer objects of the 3D object 10 has been completely printed, the user can remove the supporting material to divide the 3D object 10 into the upper part FP1 and the lower part FP2 by the separation layer SPL, as shown in FIG. 5C. After then, the user can dispose the embedded object into the object embedded region EOP and adhere the upper part FP1 and the lower part FP2 of the 3D object 10, such that the complex object SCD has been completely built up.

Further remarkably, for the 3D printing method of embodiments in the invention, the number of separation layers can be one or more. In other words, as to the embodiment shown in FIG. 4A to FIG. 4C, the control unit 130 can select multiple layer objects as the separation layer, so the 3D object 10 can be divided into at least three different parts. Likewise, as to the embodiment shown in FIG. 5A to FIG. 5C, the control unit 130 can select multiple separation regions in one layer object to form multiple separation layers, so the 3D object 10 can be divided into at least three different parts. The invention is just limited to above.

Figure 6A:
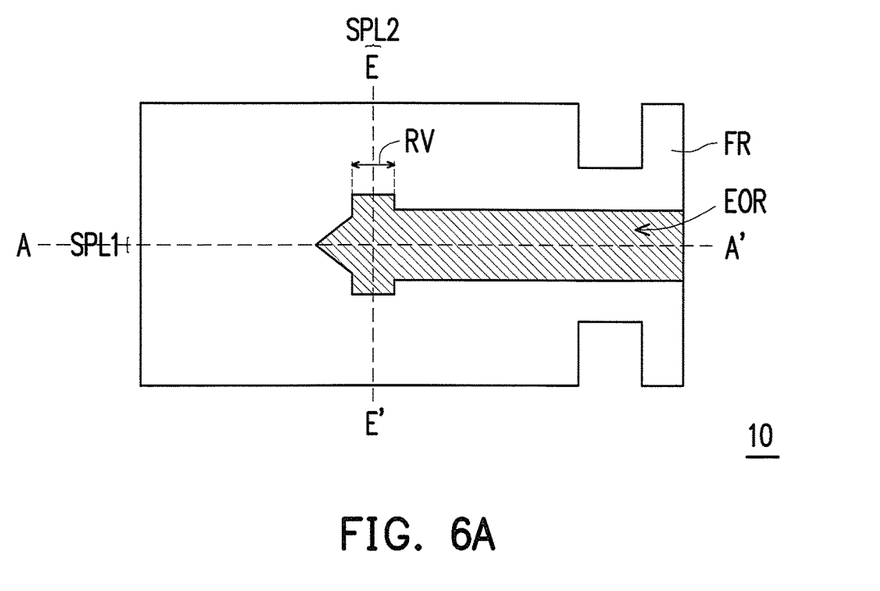
FIG. 6A-FIG. 6B are drawings, schematically illustrating a process flow for printing a three-dimensional object, according to an exemplary embodiment of the disclosure.
Figure 6B:
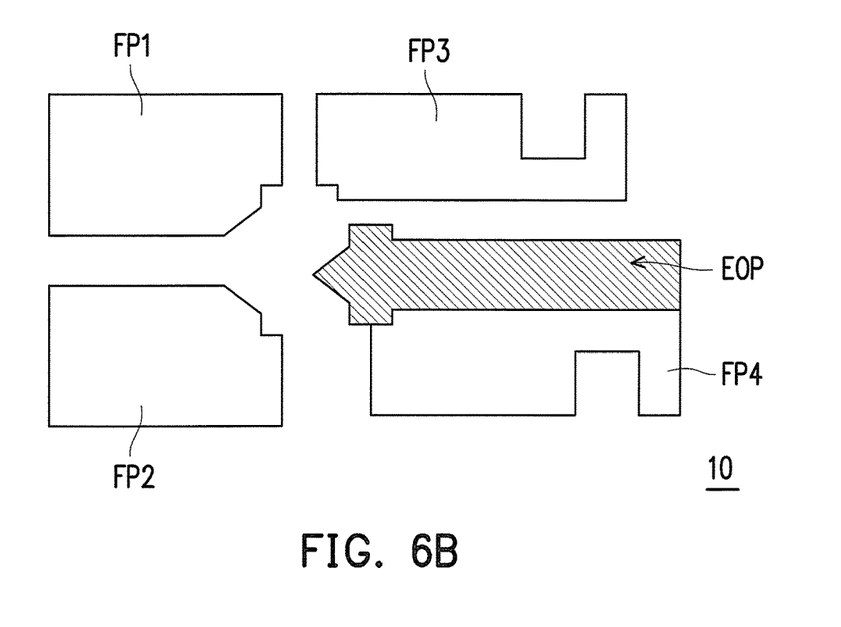

In addition to the above manner to select the separation plane, the control unit 130 can also select at least one transverse section and at least one longitudinal section as the separation plane. As shown in FIG. 6A and FIG. 6B as an embodiment, the control unit 130 can select one with maximum section area from the object embedded region in the transverse section of the 3D object 10 as the first separation layer, that is, the section on the cutting line AA', and select one with maximum section area from the object embedded region in the longitudinal section of the 3D object 10 as the second separation layer, that is, the section on the cutting line EE'. The 3D printing method used in this embodiment can be generally referred to the descriptions in the embodiments of FIG. 4A through FIG. 5C. Here, the descriptions are not repeated.

In the embodiments, when each of the layer objects of the 3D object 10 has been completely printed, the user can remove the supporting material, so the 3D object 10 is divided by the first separation layer SPL1 and the second separation layer SPL2 into four parts FP1-FP4, as shown in FIG. 6B. After then, the user can dispose the embedded object into the object embedded part EOP, and adhere all the four parts FP1-FP4 of the 3D object, such that the complex object SCD has been completely built up.

Remarkably here, although the embodiment as the example selects the transverse section and the longitudinal section as the first separation plane and the second separation plane, the invention is not just limited to this. Any manner includes selecting two separation planes with different normal line directions to form two separation layers has been covered by the same aspect above of the invention.

As to foregoing descriptions, the invention provides a three dimensional printing method and apparatus using the printing method. In applications of the disclosure, the three dimensional printing apparatus can selects a specific section of the three-dimensional object as a separation plane and coat the supporting material on the separation as selected. Thus, the three-dimensional object as completely printed can divided into two or more parts according to the separation plane serving as a cutting/dividing plane. More specifically, by the foregoing three dimensional printing method, the user can remove the supporting material after the three-dimensional object has been completely printed and the three-dimensional object thereby can be divided into multiple parts. The embedded object incapable of being printed can be disposed into a portion of the object embedded part and each part of the three-dimensional object is assembled together as a full complex object. In comparison with the conventional three-dimensional printing method for complex object, the three-dimensional printing method of disclosure can directly print the full three-dimensional object without need of stopping print process at the middle stage and then keeping on print process after manually disposing the object into the object embedded part. As a whole in application, the convenient effect can be improved. In addition, it can reduce the probability that the 3D printing apparatus in the printing process may be affected by the user's manual operation and then it can reduce the risk in losing the operation precision.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three dimensional printing method comprising:
generating a two-dimensional layer information related with a plurality of layer objects of a three-dimensional object according to a three-dimensional model information, wherein the three-dimensional object includes a main body, and a space for combining the main body of the three-dimensional object with another object is defined by the shape of the main body;
analyzing the two-dimensional layer information to identify a forming region and an object embedded region within each of the layer objects, wherein the forming regions constitute the main body of the three-dimensional object and the object embedded regions constitute the space for combining the main body of the three-dimensional object with the another object;
selecting at least one section of the three-dimensional object as a separation plane which is overlapping with a portion of the space for combining the main body of the three-dimensional object with the another object; and
printing the layer objects, layer by layer, with a forming material and a supporting material, to coat the forming material onto the forming region without overlapping with the separation plane, and coat the supporting material onto the forming region overlapping with the separation plane and the object embedded region, wherein the supporting material is removable from the three-dimensional object.

2. The three dimensional printing method of claim 1, wherein the step of selecting the at least one section of the three-dimensional object as the separation plane which is overlapping with the portion of the space for combining the main body of the three-dimensional object with the another object comprises:
calculating a sectional area of the space for combining the main body of the three-dimensional object with the another object according to the two-dimensional layer information; and
selecting a section with the sectional area of the space satisfying with a setting condition as the separation plane.

3. The three dimensional printing method of claim 2, wherein the step of selecting the section with the sectional area of the space satisfying with the setting condition as the separation plane comprises:
selecting a section with a maximum of the sectional area of the space as the separation plane.

4. The three dimensional printing method of claim 3, wherein the step of selecting the section with the sectional area of the space satisfying with the setting condition as the separation plane further comprises:
selecting a middle one of a plurality of sections with a maximum sectional area of the space as the separation plane when the sections with the maximum sectional area are continuous and more than one.

5. The three dimensional printing method of claim 1, wherein the step of selecting the at least one section of the three-dimensional object as the separation plane which is overlapping with the portion of the space for combining the main body of the three-dimensional object with the another object comprises:
selecting at least one of the layer objects as a first separation layer, and forming a formed layer for each of the rest of the layer objects.

6. The three dimensional printing method of claim 5, wherein the step of printing the layer objects, layer by layer, with the forming material and the supporting material, to coat the forming material onto the forming region without overlapping with the separation plane, and coat the supporting material onto the forming region overlapping with the separation plane and the object embedded region comprises:
coating the forming material onto the forming region and coating the supporting material onto the object embedded region when a printed one of the layer objects is the formed layer; and
coating the supporting material onto the forming region and the object embedded region when a printed one of the layer objects is the first separation layer.

7. The three dimensional printing method of claim 5, further comprising:
   selecting a part region for each of the layer objects as a separation region, wherein the separation regions form a second separation layer.

8. The three dimensional printing method of claim 7, wherein the step of printing the layer objects, layer by layer, with the forming material and the supporting material, to coat the forming material onto the forming region without overlapping with the separation plane, and coat the supporting material onto the forming region overlapping with the separation plane and the object embedded region comprises:
   coating the forming material onto the forming region other than the separation region; and
   coating the supporting material onto the separation region and the object embedded region.

9. The three dimensional printing method of claim 7, wherein a normal line direction of the first separation layer and a normal line direction of the second separation layer are not parallel.

10. The three dimensional printing method of claim 5, further comprising:
   selecting a part region for each of the layer objects as a separation region, wherein the separation regions form a separation layer.

11. A three-dimensional printing apparatus, comprising:
   a platform, having a supporting plane;
   a printing head module, disposed over the platform, the printing head module as implemented moving along a moving plane and moving along a normal line direction of the moving plane; and
   a control unit coupled to the printing head module, to control the printing head module to coat layer by layer, onto the supporting plane, according to a three-dimensional model information, so as to form a three-dimensional object including a main body, wherein a space for combining the main body of the three-dimensional object with another object is defined by the shape of the main body,
   wherein the control unit is configured to:
   generate a two-dimensional layer information related with a plurality of layer objects of the three-dimensional object according to the three-dimensional model information and analyzes the two-dimensional layer information to identify a forming region and an object embedded region within each of the layer objects, wherein the forming regions constitute the main body of the three-dimensional object and the object embedded regions constitute the space for combining the main body of the three-dimensional object with the another object;
   select at least one section of the three-dimensional object as a separation plane which is overlapping with a portion of the space for combining the main body of the three-dimensional object with the another object;
   control the printing head module to coat a forming material onto the forming region without overlapping with the separation plane; and
   control the printing head module to coat a supporting material onto the forming region overlapping with the separation plane and the object embedded region, wherein the supporting material is removable from the three-dimensional object.

12. The three-dimensional printing apparatus of claim 11, wherein the control unit calculates a sectional area of the space for combining the main body of the three-dimensional object with the another object according to the two-dimensional layer information and selects a section with the sectional area of the space satisfying with a setting condition as the separation plane.

13. The three-dimensional printing apparatus of claim 12, wherein the control unit selects a section with a maximum of the sectional area of the space as the separation plane.

14. The three-dimensional printing apparatus of claim 13, wherein the control unit selects a middle one of a plurality of sections with a maximum sectional area of the space as the separation plane when the sections with the maximum sectional area are continuous.

15. The three-dimensional printing apparatus of claim 11, wherein the control unit selects at least one of the layer objects as a first separation layer, and forms a formed layer for each of the rest of the layer objects.

16. The three-dimensional printing apparatus of claim 15, wherein the control unit controls the printing head module to coat the forming material onto the forming region and to coat the supporting material onto the object embedded region when a printed one of the layer objects is the formed layer and the control unit controls the printing head module to coat the supporting material onto the forming region and the object embedded region when a printed one of the layer objects is the first separation layer.

17. The three-dimensional printing apparatus of claim 16, wherein the control unit further selects a part region for each of the layer objects as a separation region, wherein the separation regions form a second separation layer.

18. The three-dimensional printing apparatus of claim 17, wherein the control unit controls the printing head module to coat the forming material onto the forming region other than the separation region and to coat the supporting material onto the separation region and the object embedded region.

19. The three-dimensional printing apparatus of claim 17, wherein a normal line direction of the first separation layer and a normal line direction of the second separation layer are not parallel.

20. The three-dimensional printing apparatus of claim 11, wherein the control unit further selects a part region for each of the layer objects as a separation region, wherein the separation regions form a separation layer.

* * * * *